US012256472B2

(12) United States Patent
Zhao et al.

(10) Patent No.: US 12,256,472 B2
(45) Date of Patent: Mar. 18, 2025

(54) LED DIMMING METHOD, DIMMING CONTROLLER AND SYSTEM

(71) Applicant: SHANGHAI BRIGHT POWER SEMICONDUCTOR CO., LTD., Shanghai (CN)

(72) Inventors: Wenkai Zhao, Shanghai (CN); Shunfa Zhang, Shanghai (CN); Weijia Yu, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 135 days.

(21) Appl. No.: 18/343,382

(22) Filed: Jun. 28, 2023

(65) Prior Publication Data

US 2024/0023212 A1 Jan. 18, 2024

(30) Foreign Application Priority Data

Jul. 15, 2022 (CN) ......................... 202210854603.2

(51) Int. Cl.
*H05B 45/10* (2020.01)
*H05B 45/325* (2020.01)
*H05B 45/3725* (2020.01)

(52) U.S. Cl.
CPC ........... *H05B 45/10* (2020.01); *H05B 45/325* (2020.01); *H05B 45/3725* (2020.01)

(58) Field of Classification Search
CPC .. H05B 45/10; H05B 45/325; H05B 45/3725; H05B 45/30; H05B 45/37; H05B 45/40
See application file for complete search history.

(56) References Cited

U.S. PATENT DOCUMENTS

| | | | | |
|---|---|---|---|---|
| 6,765,422 | B1 * | 7/2004 | Aslan | H03K 7/08 327/124 |
| 9,717,123 | B1 * | 7/2017 | Yao | H05B 45/10 |
| 10,447,174 | B1 * | 10/2019 | Porter, Jr. | H02M 7/497 |
| 10,890,791 | B2 * | 1/2021 | Takahashi | G02F 1/13 |
| 2017/0188420 | A1 * | 6/2017 | Kido | H05B 47/24 |

* cited by examiner

*Primary Examiner* — Minh D A

(74) *Attorney, Agent, or Firm* — Muncy, Geissler, Olds & Lowe, P.C.

(57) ABSTRACT

An LED dimming method, a dimming controller and system are disclosed. In a phase where a duty cycle of a PWM signal does not exceed a first threshold, every n periods of the PWM signal is taken as one set, taking a set as an output unit, and the duty cycle of the PWM signal is changed by incrementing or decrementing a average duty cycle by a first predetermined amount ΔP1 (0<ΔP1<0.2%), thereby adjusting an output current of an LED. In this way, the duty cycle of the PWM signal can be configured to increment by the first predetermined amount ΔP1 that is smaller than 0.2%. Moreover, when the first threshold is 10%, it can be ensured that each period of the PWM signal with duty cycle value within the range of 0-10% can be identified.

18 Claims, 3 Drawing Sheets

LED DIMMING METHOD, DIMMING CONTROLLER AND SYSTEM

CROSS-REFERENCE TO RELATED APPLICATION

This application claims the priority of Chinese patent application number 202210854603.2, filed on Jul. 15, 2022, the entire contents of which are incorporated herein by reference.

TECHNICAL FIELD

The present invention relates to the field of light-emitting diode (LED) dimming technology and, in particular, to an LED dimming method, a dimming controller and system, a lighting device and a readable storage medium.

BACKGROUND

As lighting sources, light-emitting diodes (LEDs) have the advantages of energy saving and environmental friendliness and have been found widely used. At present, dimming of an LED for controlling its brightness is usually achieved by periodically turning on and off the LED while changing the duty cycle of a pulse width modulation (PWM) signal for controlling an output current of the LED (also known as a drive current). Generally, the duty cycle of the PWM signal for regulating the output current of the LED can change from 0% to 100%, and the brightness of the LED will responsively change from 0% to 100% of its maximum brightness. Such brightness variation of the LED is typically characterized by a dimming curve. The shape of the dimming curve determines a human observer's real visual perception of a dimming effect.

With existing LED dimming solutions, when the duty cycle of the PWM signal is in the range of 0-10%, the output current of the LED varies in steps. This is reflected by non-smoothness of the dimming curve featuring noticeable steps, as shown in FIG. 1. Consequently, brightness of the LED will jump from level to level, causing the observer's visual discomfort from the dimming effect or brightness variation.

SUMMARY OF THE INVENTION

It is an object of the present invention to provide an LED dimming method, a dimming controller and system, which are capable of mitigating or even eliminating stepped variation of an output current of an LED, imparting a smoother dimming curve to the LED and enabling the LED to create a dimming effect or brightness variation which provides a human observer with more visual comfort.

To this end, the present invention provides an LED dimming method for adjusting an output current of an LED by changing a duty cycle of a pulse width modulation (PWM) signal, wherein when the duty cycle of the PWM signal is smaller than a first threshold, the dimming method comprises:

taking every n periods of the PWM signal as one set, and taking the average duty cycle of the n periods of each set as a duty cycle of the PWM signal of a corresponding set; and taking a set as an output unit, outputting at least two sets of the PWM signal in the order of incrementing or decrementing the average duty cycle by a first predetermined amount ΔP1, thereby changing the duty cycle of the PWM signal, wherein n is an integer ≥2, 0<ΔP1<0.2%, and wherein at least two periods of the PWM signal in at least one set have different duty cycles.

Optionally, the average duty cycle P of the n periods of the PWM signal in each set may be calculated according to:

$$P=(C1*P1+C2*P2+ \dots +Ci*Pi+ \dots +Ck*Pk)/n,$$

where C1+C2+ . . . +Ci+ . . . +Ck=n, P1 to Pk are k duty cycles with different values, Ci is the number of periods out of the n periods of the PWM signal in which the duty cycle is Pi, and i=1 to k.

Optionally, the difference between the maxima and minima of the k duty cycles P1-Pk may be greater than or equal to 0.2%.

Optionally, the first threshold may be smaller than or equal to 10%.

Optionally, when the duty cycle of the PWM signal exceeds the first threshold and is smaller than or equal to a second threshold, the dimming method may further comprise: incrementing or decrementing the duty cycle of a single period of the PWM signal by a second predetermined amount ΔP2 to change the duty cycle of the PWM signal, wherein ΔP2≥ΔP1, and the second threshold is smaller than 100% and greater than the first threshold.

Optionally, when the duty cycle of the PWM signal exceeds the second threshold and is smaller than 100%, the dimming method may further comprise: incrementing or decrementing the duty cycle of a single period of the PWM signal by a third predetermined amount ΔP3 to change the duty cycle of the PWM signal, wherein ΔP3≥ΔP2.

Optionally, ΔP3 may be an integral multiple of ΔP2.

Optionally, the first threshold may be 10%, wherein the second threshold is 50%; ΔP1=0.1%; ΔP2≥0.2%; and ΔP3=2*ΔP2.

Optionally, the LED dimming method may further comprise: converting the output PWM signal into a voltage signal proportional to the duty cycle of the PWM signal; and providing the voltage signal to the LED in order to adjust the output current of the LED.

Based on the same inventive concept, the present invention also provides a dimming controller, wherein the dimming controller is coupled to a light-emitting diode (LED), and is configured to: output a pulse width modulation (PWM) signal; and change a duty cycle of the PWM signal by a dimming method:

wherein when the duty cycle of the PWM signal is smaller than a first threshold, the dimming method comprises:

taking every n periods of the PWM signal as one set, and taking an average duty cycle of the n periods of each set as a duty cycle of the PWM signal of the corresponding set; and taking the set as an output unit, outputting at least two sets of the PWM signal in an order of incrementing or decrementing the average duty cycle by a first predetermined amount ΔP1, thereby changing the duty cycle of the PWM signal, wherein n is an integer ≥2, 0<ΔP1<0.2%, and wherein at least two periods of the PWM signal in at least one set have different duty cycles.

Optionally, the average duty cycle P of the n periods of the PWM signal in each set may be calculated according to:

$$P=(C1*P1+C2*P2+ \dots +Ci*Pi+ \dots +Ck*Pk)/n,$$

where $C1+C2+ \ldots +Ci+ \ldots +Ck=n$, P1 to Pk are k duty cycles with different values, Ci is the number of periods out of the n periods of the PWM signal in which the duty cycle is Pi, and i=1 to k.

Optionally, the difference between the maxima and minima of the k duty cycles P1-Pk may be greater than or equal to 0.2%.

Optionally, the first threshold may be smaller than or equal to 10%.

Optionally, when the duty cycle of the PWM signal exceeds the first threshold and is smaller than or equal to a second threshold, the dimming method may further comprise: incrementing or decrementing the duty cycle of a single period of the PWM signal by a second predetermined amount ΔP2 to change the duty cycle of the PWM signal, wherein $\Delta P2 \geq \Delta P1$, and the second threshold is smaller than 100% and greater than the first threshold.

Optionally, when the duty cycle of the PWM signal exceeds the second threshold and is smaller than 100%, the dimming method may further comprise: incrementing or decrementing the duty cycle of a single period of the PWM signal by a third predetermined amount ΔP3 to change the duty cycle of the PWM signal, wherein $\Delta P3 \geq \Delta P2$.

Optionally, ΔP3 may be an integral multiple of ΔP2.

Optionally, the first threshold may be 10%, wherein the second threshold is 50%; $\Delta P1=0.1\%$; $\Delta P2 \geq 0.2\%$; and $\Delta P3=2*\Delta P2$.

Based on the same inventive concept, the present invention also provides a dimming system comprising a switched-mode power supply, a conversion circuit and the dimming controller of the present invention, which are sequentially coupled, the conversion circuit configured to output a voltage signal to the switched-mode power supply, the voltage signal proportional to a duty cycle of a pulse width modulation (PWM) signal output from the dimming controller, the switched-mode power supply having an output terminal connected in parallel with an LED and configured to apply a corresponding voltage to the LED.

Compared with the prior art, the present invention has at least the following benefits:

1. In the phase where the duty cycle of the PWM signal does not exceed the first threshold (e.g., smaller than or equal to 10%), every n periods of the PWM signal is taken as one set, and the duty cycle of the PWM signal is changed by incrementing or decrementing the average duty cycle by the first predetermined amount ΔP1 ($0<\Delta P1<0.2\%$) on a set basis, thereby adjusting the output current of the LED. In this way, the duty cycle of the PWM signal can be configured to increment by the first predetermined amount ΔP1 that is smaller than 0.2%, while ensuring that each period of the PWM signal with duty cycle value not exceeding the first threshold (e.g., 0-10%) can be identified. This can mitigate or even eliminate stepped variation of the output current of the LED corresponding to the duty cycle of the PWM signal that is smaller than 10%, thereby imparting a smoother dimming curve to the LED and enabling the LED to create a dimming effect or brightness variation providing improved visual comfort to a human observer.
2. In the phase where the duty cycle of the PWM signal exceeds the first threshold (e.g., 10%) and is smaller than or equal to the second threshold, the duty cycle of the PWM signal is changed by incrementing or decrementing it by the second predetermined amount ΔP2 on a period basis. In this way, control of the duty cycle of the PWM signal is made simpler, and when $\Delta P2>\Delta P1$, the duty cycle of the PWM signal can be changed to a desired level in a shorter time.
3. In the phase where the duty cycle of the PWM signal exceeds the second threshold (e.g., 50%), the duty cycle of the PWM signal is changed by incrementing or decrementing it by the third predetermined amount ΔP3 on a period basis. Moreover, when $\Delta P3>\Delta P2$, the duty cycle of the PWM signal can be changed to a desired level in a shorter time.

DETAILED DESCRIPTION

Figure 1:
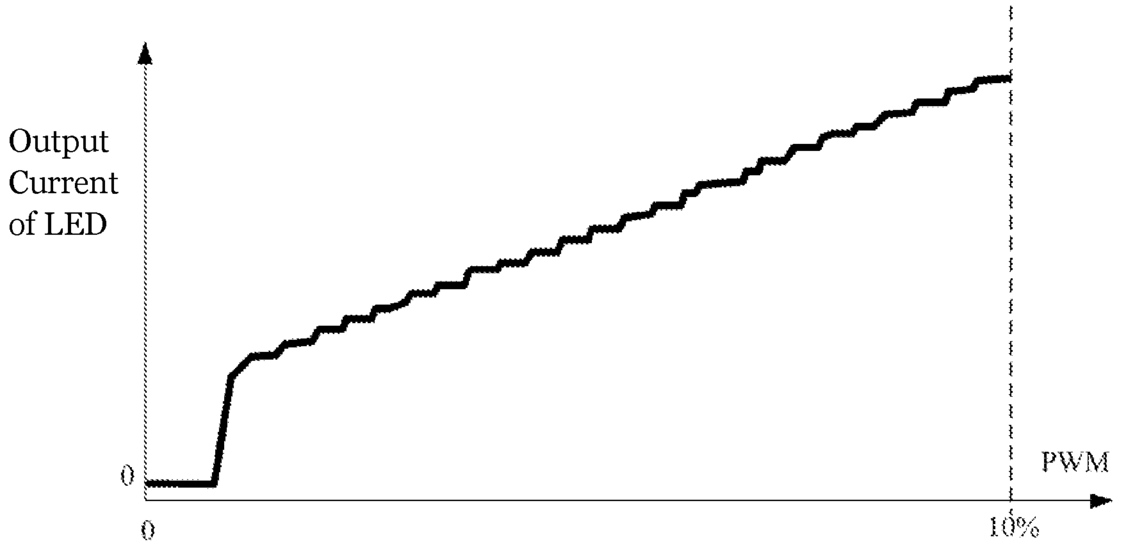
Fig. 1 Prior Art
FIG. 1 schematically illustrates a dimming curve of an LED in a duty cycle range of of a PWM signal in a conventional LED dimming method.

The following description sets forth numerous specific details in order to provide a more thorough understanding of the present invention. However, it will be apparent to those skilled in the art that the present invention can be practiced without one or more of these specific details. In other instances, well-known technical features have not been described in order to avoid unnecessary obscuring of the invention. It is to be understood that the invention may be embodied in many different forms and should not be construed as being limited to the embodiments set forth below. Rather, these embodiments are provided so that this disclosure is thorough and conveys the scope of the invention to those skilled in the art. In the drawings, like reference numerals refer to like elements throughout. It will be understood that when an element is referred to as being "connected to" or "coupled to" another element, it can be directly connected or coupled to the other element, or intervening elements may also be present. In contrast, when an element is referred to as being "directly connected to" another element, there are no intervening elements. Although the terms "left", "right" or the like may be used herein to describe various elements, components and/or portions, these elements, components and/or portions shall not be construed as being limited by such terms. These terms are only intended to distinguish one element, component or portion from another element, component or portion. Therefore, without departing from the teachings of the present invention, a "left" element, component or portion may be alternatively referred to as a "right" element, component or portion. As used herein, the singular forms "a", "an" and "the" are intended to include the plural forms as well, unless the context clearly indicates otherwise. It will be further understood that the term "comprising" specifies the presence of stated features, steps, operations, elements, and/or components, but do not preclude the presence or addition of one or more other features, steps, operations, elements, components, and/or groups thereof. As used herein, the term "and/or" includes any and all combinations of the associated listed items.

As discussed in the Background section, the existing LED dimming methods are associated with the following problem. When the duty cycle of a PWM signal is in the range of 0-10%, an output current of an LED varies in steps. Consequently, the dimming curve of the LED is non-smooth and has noticeable steps, causing a human observer's visual discomfort from the dimming effect or brightness variation.

Figure 2:
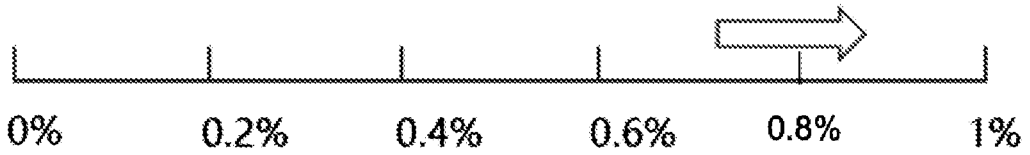
Fig.2 Prior Art
FIG. 2 schematically illustrates the duty cycle of a PWM signal rising from 0 to 1% in a conventional LED dimming method.

The inventors have found from research that the above problem of stepped variation and non-smoothness of a dimming curve is attributable to the fact that, in the existing LED dimming solutions, when the duty cycle of a PWM signal is configured to increase by increments of smaller than 0.2% within the range of 0-10%, some dimming values cannot be identified. On the other hand, referring to FIG. 2, if the duty cycle of the PWM signal is configured to increase by increments of not smaller than 0.2% (i.e., equal to 0.2%), although each dimming value is identifiable, due to the larger increments of the PMW signal's duty cycle, the current will change in relatively large transition steps throughout the dimming range. Consequently, the dimming curve will still be problematic due to stepped variation and non-smoothness.

In view of the above, the present invention provides an LED dimming technique, through a combination of sets of n periods of the PWM signal in which the duty cycle of the PWM signal may change to enable the duty cycle of the output PWM signal to change within the range of 0-10% by unit increments of not greater than 0.1%. In this way, stepped variation of an output current of the LED can be mitigated or even eliminated, imparting a smoother dimming curve to the LED and enabling the LED to create a dimming effect or brightness variation providing a human observer with more visual comfort.

The present invention will be described in greater detail below with reference to the accompanying drawings and to specific embodiments. Advantages and features of the invention will become more apparent from the following description. Note that the figures are provided in a very simplified form not necessarily drawn to exact scale and for the only purpose of facilitating easy and clear description of the disclosed embodiments.

Reference is now made to FIGS. 3 to 6. In an LED dimming method according to an embodiment of the present invention, an output current of an LED is adjusted by changing the duty cycle of a PWM signal.

For example, for increasing of the duty cycle of the PWM signal from 0 to 100%, a dimming curve of the LED can be obtained by the LED dimming method of the present embodiment. Specifically, the LED dimming method of the present embodiment includes the following three phases.

In a first phase, the duty cycle of the PWM signal increases from 0 to a first threshold (i.e., the duty cycle of the PWM signal is smaller than the first threshold in this phase). A dimming process for the first phase includes the steps as follows.

First of all, taking every n periods of the PWM signal as one set, and taking an average duty cycle of the n periods of each set as a duty cycle of the PWM signal of a corresponding specific set.

Next, taking a set as an output unit, outputting at least two sets of the PWM signal in the order of incrementing the average duty cycle by a first predetermined amount ΔP1, thus incrementally increasing the duty cycle of the PWM signal from 0 to the first threshold.

Wherein, n is an integer ≥2, and 0<ΔP1<0.2%. There is at least one set in which at least two of the periods of the PWM signal have different duty cycles. The first threshold is smaller than or equal to 10%. The average duty cycle P of the n periods of the PWM signal in each set is calculated according to:

$$P=(C_1*P_1+C_2*P_2+ \dots +C_i*P_i+ \dots +C_k*P_k)/n,$$

where $C_1+C_2+ \dots +C_i+ \dots +C_k=n$, $P_1$ to $P_k$ are k duty cycles with different values, $C_i$ is the number of periods out of the n periods of the PWM signal in which the duty cycle is $P_i$, where i=1 to k.

Optionally, the difference between the maxima and minima of the k duty cycles $P_1$-$P_k$ is greater than or equal to 0.2%.

Figure 3:
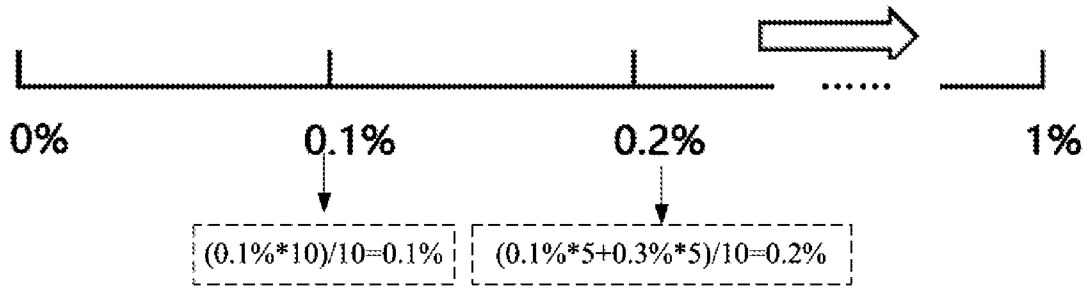
FIG. 3 schematically illustrates the duty cycle of a PWM signal rising from 0 to 1% in an LED dimming method according to an embodiment of the present invention.
Figure 4:
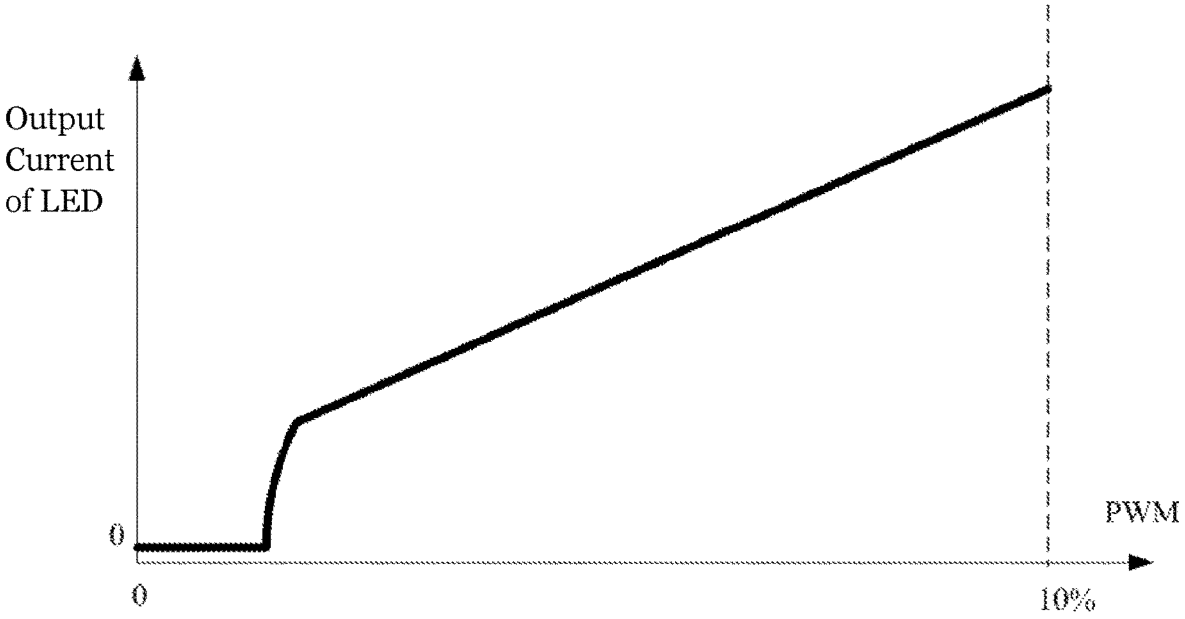
FIG. 4 schematically illustrates a dimming curve of an LED in a duty cycle range of of a PWM signal according to an embodiment of the present invention.

As an example, the first threshold is equal to 1%, ΔP1=0.1%, and n=10. Referring to FIG. 3, 10 periods of the PWM signal may be taken as one set. A first set is so configured that the duty cycle of the period is 0.1% for each of the 10 periods. Therefore, their average duty cycle is 0.1%. That is, for the first set, $C_1$=10, $P_1$=0.1% and P=0.1%. A second set is so configured that the duty cycle of the period is 0.1% for each of 5 periods and 0.3% for each of the other 5 periods. Therefore, their average duty cycle is 0.2%. That is, for the second set, $C_1$=5, $C_2$=5, $P_1$=0.1%, $P_2$=0.3% and $$P=(5*0.1\%+5*00.3\%)/10=0.2\%.$$

A third set is so configured that the duty cycle of the period is 0.3% for each of the 10 periods. Therefore, their average duty cycle is 0.3%. That is, for the third set, $C_1$=10, $P_1$=0.3% and P=0.3%. The other sets may be configured in a similar way, until the last set (i.e., a tenth set) has an average duty cycle of 1%. In other words, in this example, the PWM signal is output ten sets, and each set has 10 periods of the PWM signal, with the average duty cycle incrementing on a set basis by 0.1%. In this way, the duty cycle of the PWM signal can incrementally increase from 0 to 1% over 100 periods.

Likewise, in another example of this embodiment, the first threshold is equal to 10%, ΔP1=0.1% and n=10. The PWM signal may be output one hundred sets, and each set has 10 periods of the PWM signal, with the average duty cycle incrementing on a set basis by 0.1%. In this way, incrementally increase the duty cycle of the PWM signal from to 10% over 1000 periods.

Of course, in other embodiments of the present invention, n may be any suitable integer greater than or equal to 2. Moreover, the first threshold may be any suitable percentage not greater than 10%, and ΔP1 may be any suitable percentage smaller than 0.2%.

In this first phase, through a combination of sets of n periods of the PWM signal with duty cycles that are not exactly the same, the PWM signal can be output with the duty cycle changing within the range of 0-10% by unit increments of not greater than 0.1%. In this way, stepped variation of an output current of the LED can be mitigated or even eliminated, imparting a smoother dimming curve to the LED (see FIG. 4) and improving the comfort of human vision for LED dimming effect or brightness change.

In a second phase, the duty cycle of the PWM signal increases from the first threshold to a second threshold (i.e., the duty cycle of the PWM signal exceeds the first threshold but does not exceed the second threshold in second phase). A dimming process for this phase includes: incrementing the duty cycle of a single period of the PWM signal by a second predetermined amount ΔP2 to change the duty cycle of the PWM signal from the first threshold to the second threshold.

Wherein, ΔP2≥ΔP1. For example, ΔP2≥0.2%. Moreover, the second threshold is smaller than 100% and greater than the first threshold.

Figure 5:
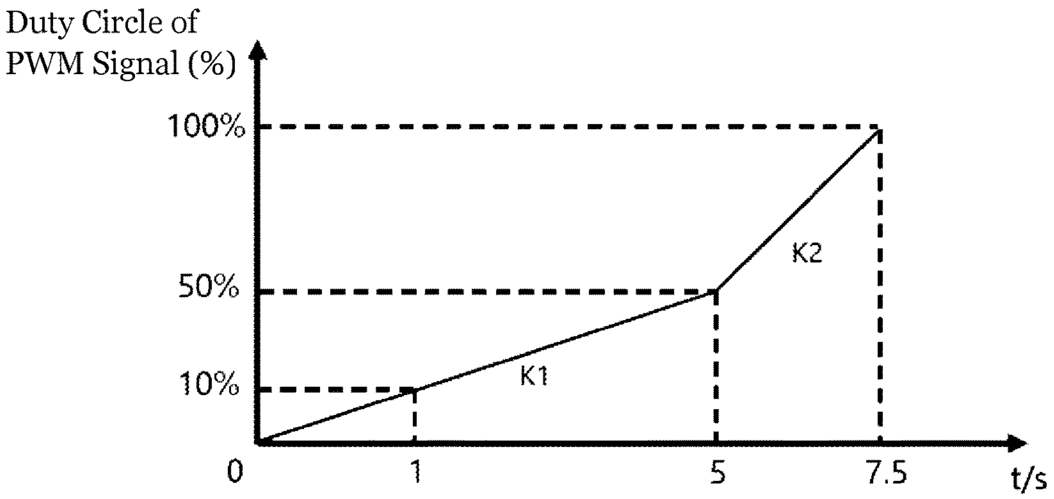
FIG. 5 schematically illustrates a curve of duty cycle versus time of a PWM signal according to an embodiment of the present invention.

As an example, the first threshold is 10%, the second threshold is 50%, and ΔP2=0.2%, as shown in FIG. 5.

In a third phase, the duty cycle of the PWM signal increases from the second threshold to 100% (i.e., the duty cycle of the PWM signal exceeds the second threshold but does not exceed 100% in third phase). A dimming process for this phase includes: incrementing the duty cycle of a single period of the PWM signal by a third predetermined amount ΔP3 to change the duty cycle of the PWM signal from the second threshold to 100%.

Wherein, ΔP3≥ΔP2. Moreover, ΔP3 is an integral multiple of ΔP2.

As an example, the second threshold is 50%, ΔP2=0.2% and ΔP3=2*ΔP2=0.4%, as shown in FIG. 5. In this case, a slope K2 of the duty cycle curve of the PWM signal in the third phase and a slope K1 of the duty cycle curve of the PWM signal in the second phase satisfy K2=2*K1.

Preferably, in the second and third phases, ΔP2 and ΔP3 are both greater than ΔP1. This enables the duty cycle of the PWM signal to a desired level within a shorter time, resulting in a higher dimming rate.

It would be appreciated that, although the duty cycle of the PWM signal has been described in above embodiments as increasing from 0 to 100%, the present invention is not so limited. In other embodiments of the present invention, the duty cycle of the PWM signal may decrease from 100% to 0. In these embodiments, in the first phase, the average duty cycle may decrement by ΔP1 from the first threshold to 0. In the second phase, the duty cycle may decrement by ΔP2 from the second threshold to the first threshold. In the third phase, the duty cycle may decrement by ΔP3 from 100% to the second threshold.

Of course, the LED dimming method of the present invention may be applied only to a portion of any of the first to third phases. That is, the target duty cycle value may differ from the start and end values of the three phases. In this case, the method may be utilized over a period of time adaptively chosen from the above three phases according to the phases of the current and target duty cycle values to increase or decrease the duty cycle of the PWM signal from the current value to the target value.

Figure 6:
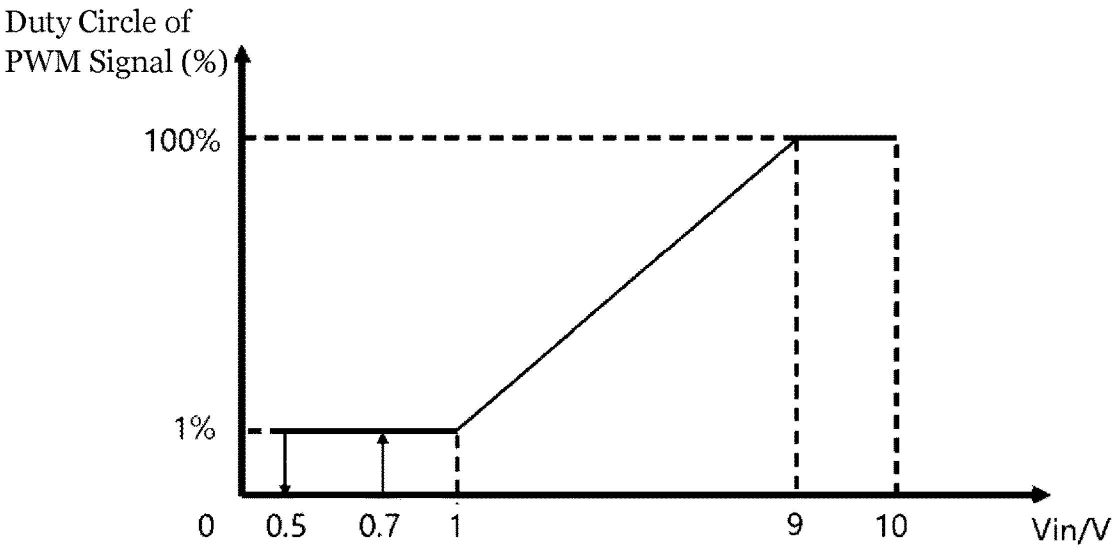
FIG. 6 schematically illustrates a curve of duty cycle versus voltage of a PWM signal according to an embodiment of the present invention.

In addition, referring to FIG. 6, the LED dimming method according to various embodiments of the present invention may be used for dimming in the voltage of 0 to 10 V, typically 0.5 V to 10 V. Accordingly, in other embodiments of the present invention, the PWM signal output in real time may be further converted into a voltage signal proportional to the duty cycle of the PWM signal (i.e., a voltage provided by a dimming power supply or switched-mode power supply), which may be then provided to the LED in order to adjust its output current. As an example, the PWM signal may be used to turn the LED on and off in a gradual manner, and the hysteresis windows are as follows: it is turned on at 0.7 V and off at 0.5 V. A voltage of 0.5 V to 1 V corresponds to 1% of the duty cycle of the PWM signal. A voltage of 1 V to 9 V corresponds to 1% to 99% of the duty cycle of the PWM signal. A voltage of 9 V to 10 V corresponds to 100% of the duty cycle of the PWM signal.

Figure 7:
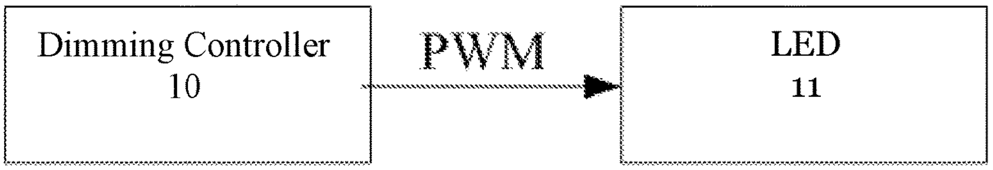
FIG. 7 is a schematic diagram illustrating the structures of a dimming controller and a lighting device incorporating the dimming controller according to an embodiment of the present invention.

Based on the same inventive concept, referring to FIG. 7, in embodiments of the present invention, there is also provided a dimming controller 10, which is coupled to an LED 11 and configured to output a PWM signal and change its duty cycle in accordance with the LED dimming method of the present invention, thereby adjusting an output current and hence brightness of the LED 11.

Figure 8:
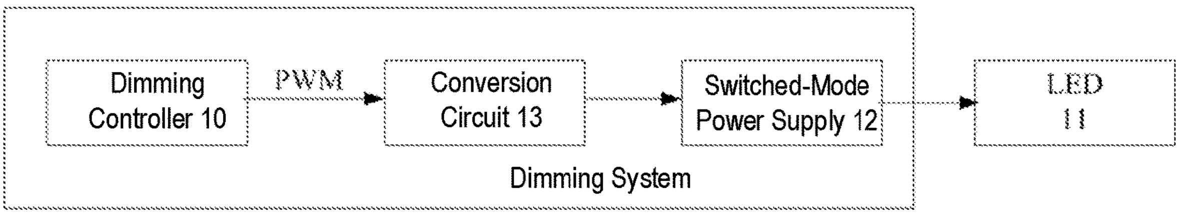
FIG. 8 is a schematic diagram illustrating the structures of a dimming system and a lighting device incorporating the dimming system according to an embodiment of the present invention.

Based on the same inventive concept, referring to FIG. 8, in embodiments of the present invention, there is also provided a dimming system including a switched-mode power supply 12, a conversion circuit 13 and the dimming controller 10 of the present invention. The dimming controller 10, the conversion circuit 13 and the switched-mode power supply 12 are sequentially coupled. The conversion circuit 13 is configured to output a voltage signal to the switched-mode power supply. The voltage signal is proportional to a duty cycle of a PWM signal output from the dimming controller 10. An output terminal of the switched-mode power supply 12 is connected in parallel with an LED 11 and configured to apply a corresponding voltage to the LED 11 for adjusting an output current and hence brightness of the LED.

Based on the same inventive concept, in embodiments of the present invention, there is also provided lighting device including an LED 11 and the dimming controller 10 of the present invention coupled to the LED 11, as shown in FIG. 7. Alternatively, it may include an LED 11 and the dimming system of the present invention coupled to the LED 11, as shown in FIG. 8.

Based on the same inventive concept, in embodiments of the present invention, there is also provided a readable storage medium storing thereon a computer program, which may include codes/computer executable instructions and, when executed by a processor, carries out the above-described LED dimming method or any variation thereof. The readable storage medium may be any medium capable of embodying, storing, transmitting, propagating or communicating instructions. For example, the readable storage medium may include, but is not limited to, an electronic, magnetic, optical, electromagnetic, infrared or semiconductor system, apparatus, device, or propagation medium. More specific examples of the readable storage medium may include a magnetic storage device such as a magnetic tape or a hard disk drive (HDD), an optical storage device such as a compact disc read-only memory (CD-ROM), a memory such as a random access memory (RAM) or a USB flash drive, and/or a wired/wireless communication link.

The description presented above is merely that of some preferred embodiments of the present invention and does not limit the scope thereof in any sense. Any and all changes and modifications made by those of ordinary skill in the art based on the above teachings fall within the scope as defined in the appended claims.

What is claimed is:

1. A light-emitting diode (LED) dimming method for adjusting an output current of an LED by changing a duty cycle of a pulse width modulation (PWM) signal, wherein when the duty cycle of the PWM signal is smaller than a first threshold, the dimming method comprises:

taking every n periods of the PWM signal as one set, and taking an average duty cycle of the n periods of each set as a duty cycle of the PWM signal of the corresponding set; and taking the set as an output unit, outputting at least two sets of the PWM signal in an order of incrementing or decrementing the average duty cycle by a first predetermined amount ΔP1, thereby changing the duty cycle of the PWM signal, wherein n is an integer ≥2, 0<ΔP1<0.2%, and wherein at least two periods of the PWM signal in at least one set have different duty cycles.

2. The LED dimming method of claim 1, wherein the average duty cycle P of the n periods of the PWM signal in each set is calculated according to:

$$P=(C_1*P_1+C_2*P_2+ \ldots +C_i*P_i+ \ldots +C_k*P_k)/n,$$

where $C_1+C_2+ \ldots +C_i+ \ldots +C_k=n$, $P_1$ to $P_k$ are k duty cycles with different values, $C_i$ is the number of periods out of the n periods of the PWM signal in which the duty cycle is $P_i$, and i=1 to k.

3. The LED dimming method of claim 2, wherein a difference between a maxima and a minima of the k duty cycles $P_1$-$P_k$ is greater than or equal to 0.2%.

4. The LED dimming method of claim 1, wherein the first threshold is smaller than or equal to 10%.

5. The LED dimming method of claim 1, wherein when the duty cycle of the PWM signal exceeds the first threshold and is smaller than or equal to a second threshold, the dimming method further comprises: incrementing or decrementing the duty cycle of a single period of the PWM signal by a second predetermined amount ΔP2 to change the duty cycle of the PWM signal, wherein ΔP2≥ΔP1, and the second threshold is smaller than 100% and greater than the first threshold.

6. The LED dimming method of claim 5, wherein when the duty cycle of the PWM signal exceeds the second threshold and is smaller than 100%, the dimming method further comprises: incrementing or decrementing the duty cycle of a single period of the PWM signal by a third predetermined amount ΔP3 to change the duty cycle of the PWM signal, wherein ΔP3≥ΔP2.

7. The LED dimming method of claim 6, wherein ΔP3 is an integral multiple of ΔP2.

8. The LED dimming method of claim 6, wherein the first threshold is 10%; the second threshold is 50%; ΔP1=0.1%; ΔP2≥0.2%; and ΔP3=2*ΔP2.

9. The LED dimming method of claim 1, further comprising: converting the output PWM signal into a voltage signal proportional to the duty cycle of the PWM signal; and providing the voltage signal to the LED in order to adjust the output current of the LED.

10. A dimming controller, wherein the dimming controller is coupled to a light-emitting diode (LED), and is configured to: output a pulse width modulation (PWM) signal; and change a duty cycle of the PWM signal by a dimming method:

wherein when the duty cycle of the PWM signal is smaller than a first threshold, the dimming method comprises:

taking every n periods of the PWM signal as one set, and taking an average duty cycle of the n periods of each set as a duty cycle of the PWM signal of the corresponding set; and taking the set as an output unit, outputting at least two sets of the PWM signal in an order of incrementing or decrementing the average duty cycle by a first predetermined amount ΔP1, thereby changing the duty cycle of the PWM signal, wherein n is an integer ≥2, 0<ΔP1<0.2%, and wherein at least two periods of the PWM signal in at least one set have different duty cycles.

11. A dimming system, comprising a switched-mode power supply, a conversion circuit and the dimming controller of claim 10 that are sequentially coupled, wherein the conversion circuit is configured to output a voltage signal to the switched-mode power supply, wherein the voltage signal is proportional to a duty cycle of a pulse width modulation (PWM) signal output from the dimming controller, and wherein the switched-mode power supply has an output terminal connected in parallel with a light-emitting diode (LED) and is configured to apply a corresponding voltage to the LED.

12. The dimming controller of claim 10, wherein the average duty cycle P of the n periods of the PWM signal in each set is calculated according to:

$$P=(C_1*P_1+C_2*P_2+ \ldots +C_i*P_i+ \ldots +C_k*P_k)/n,$$

where $C_1+C_2+ \ldots +C_i+ \ldots +C_k=n$, $P_1$ to $P_k$ are k duty cycles with different values, $C_i$ is the number of periods out of the n periods of the PWM signal in which the duty cycle is $P_i$, and i=1 to k.

13. The dimming controller of claim 12, wherein a difference between a maxima and a minima of the k duty cycles $P_1$-$P_k$ is greater than or equal to 0.2%.

14. The dimming controller of claim 10, wherein the first threshold is smaller than or equal to 10%.

15. The dimming controller of claim 10, wherein when the duty cycle of the PWM signal exceeds the first threshold and is smaller than or equal to a second threshold, the dimming method further comprises: incrementing or decrementing the duty cycle of a single period of the PWM signal by a second predetermined amount ΔP2 to change the duty cycle of the PWM signal, wherein ΔP2≥ΔP1, and the second threshold is smaller than 100% and greater than the first threshold.

16. The LED dimming method of claim 15, wherein when the duty cycle of the PWM signal exceeds the second threshold and is smaller than 100%, the dimming method further comprises: incrementing or decrementing the duty cycle of a single period of the PWM signal by a third predetermined amount ΔP3 to change the duty cycle of the PWM signal, wherein ΔP3≥ΔP2.

17. The LED dimming method of claim 16, wherein the first threshold is 10%; the second threshold is 50%; ΔP1=0.1%; ΔP2≥0.2%; and ΔP3=2*ΔP2.

18. The LED dimming method of claim 16, wherein ΔP3 is an integral multiple of ΔP2.

* * * * *